United States Patent
Gailloux et al.

(10) Patent No.: US 9,781,255 B1
(45) Date of Patent: Oct. 3, 2017

(54) AUTHENTICATION OF PHONE CALL ORIGINATION

(71) Applicant: Sprint Communications Company L.P., Overland Park, KS (US)

(72) Inventors: Michael A. Gailloux, Overland Park, KS (US); Lauren Ricardo St. Aubyn King, Somerset, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/733,727

(22) Filed: Jun. 8, 2015

(51) Int. Cl.
*H04M 1/66* (2006.01)
*H04M 3/42* (2006.01)
*H04W 12/04* (2009.01)
*H04W 4/16* (2009.01)
*H04M 3/51* (2006.01)

(52) U.S. Cl.
CPC ..... *H04M 3/42042* (2013.01); *H04M 3/5183* (2013.01); *H04W 4/16* (2013.01); *H04W 12/04* (2013.01)

(58) Field of Classification Search
CPC ........... H04M 3/42042; H04M 3/5183; H04M 3/435; H04M 3/42059; H04M 15/06; H04M 1/663; H04W 4/16; H04W 12/04
USPC ......................................................... 455/411
See application file for complete search history.

(56) References Cited

U.S. PATENT DOCUMENTS

| | | | | |
|---|---|---|---|---|
| 8,774,379 B1* | 7/2014 | Youngs | ................. | H04M 15/06 379/142.02 |
| 9,060,057 B1* | 6/2015 | Danis | ................. | H04M 3/42059 |
| 2007/0081648 A1* | 4/2007 | Abramson | ............ | H04M 3/436 379/161 |
| 2008/0159501 A1* | 7/2008 | Cai | ................... | H04M 3/42059 379/142.05 |
| 2008/0181379 A1* | 7/2008 | Chow | ................. | H04L 63/0823 379/142.05 |
| 2014/0241513 A1* | 8/2014 | Springer | ............... | H04M 3/493 379/88.01 |

\* cited by examiner

*Primary Examiner* — Marcus Hammonds (57) ABSTRACT

A method of authenticating a call origination directed to an enterprise call center. The method comprises receiving a first call origination message from a communication network by a computer system, wherein the first call origination message comprises an automatic number identification (ANI) storing a first phone number, determining by the computer system that the first phone number is not associated with an originator of the first call origination message, and responsive to determining that the first phone number is not associated with the originator of the first call origination message, dropping the first call origination message by the computer system and not answering the associated call, whereby the enterprise call center reduces its vulnerability to call origination spoofing.

20 Claims, 6 Drawing Sheets

AUTHENTICATION OF PHONE CALL ORIGINATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Voice calls in communication networks may be established using signaling messages such as origination messages. Origination messages may contain an automatic number identification (ANI) field that is intended to identify a calling number originating the voice call and an identity of the subscriber associated with the calling number. For example, John Smith may have a mobile phone associated with phone number 555-555-1234. When John Smith dials a toll-free number, an origination message may be sent by the communication network to an interactive voice response (IVR) system associated with the toll-free number, and the ANI of that origination message may identify the calling number as 555-555-1234 and may identify the subscriber associated with the calling number as John Smith. In some cases, however, the ANI can be spoofed. Said in other words, using technology such as an ANI-spoofing application, a call origination message may be initiated by a different calling device than John Smith's mobile phone that nevertheless carries an ANI that identifies the calling number as 555-555-1234 and the subscriber associated with the calling number as John Smith.

SUMMARY

In an embodiment, a method of authenticating a call origination directed to an enterprise call center is disclosed. The method comprises receiving a call origination message from a user equipment (UE), wherein the call origination message comprises a called number associated with the enterprise call center and determining by a communication network server system that the called number is white listed to receive a call origination authentication premium service. The method further comprises determining a mobile equipment identity (MEID) of the UE by the communication network server system using information provided by an enhanced Node B (eNB) and determining a calling number of the UE by the communication network server system based on the MEID of the UE. The method further comprises, responsive to determining that the called number is white listed, determining by the communication network server system that the calling number of the UE matches a phone number in an automatic number identification (ANI) field in the call origination message, and responsive to determining that the calling number of the UE matches the phone number in the ANI, encrypting a call verified status by the communication network server system using a secret key known to the enterprise call center. The method further comprises adding by the network communication server system the encrypted call verified status to a metadata field of the call origination message and transmitting the call origination message comprising the encrypted call verified status by the network communication server system to the enterprise call center, whereby the enterprise call center is able to reduce its vulnerability to call origination spoofing.

In another embodiment, a method of authenticating a call origination directed to an enterprise call center is disclosed. The method comprises receiving a call origination authentication request message by a communication network server system from the enterprise call center, wherein the origination authentication request message comprises a calling number associated with a call origination terminated on the enterprise call center and a called number associated with the enterprise call center and determining by the communication network server system that a user equipment (UE) associated with the calling number is off-hook and that the UE is connected to the called number. The method further comprises, responsive to determining by the communication network server system that the UE associated with the calling number is off-hook and connected to the called number, determining subscriber account status information by the communication network server system, and, responsive to determining subscriber account status information, encrypting the subscriber account status information by the communication network server system using a secret key known to the enterprise call center. The method further comprises transmitting the encrypted subscriber account status information by the communication network server system to the enterprise call center, whereby the enterprise call center is able to reduce its vulnerability to call origination spoofing.

In yet another embodiment, a method of authenticating a call origination is disclosed. The method comprises receiving a first call origination message from a communication network by a computer system, wherein the first call origination message comprises an automatic number identification (ANI) storing a first phone number, where the computer system is associated with a called number in the first call origination message. The method further comprises determining by the computer system that the first phone number is not associated with an originator of the first call origination message and responsive to determining that the first phone number is not associated with the originator of the first call origination message, dropping the first call origination message by the computer system and not answering the associated call, whereby a called party associated with the called number reduces its vulnerability to call origination spoofing.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Handling phone calls to enterprise call centers entails business expenses. The enterprise does not want to waste its resources—or to undergo unnecessary expense—handling calls that are spoofed and enter the call center system under false pretenses. Call centers may examine an automatic number identification (ANI) field of a call origination message to screen incoming calls. The ANI field may contain a phone number and a name of a communication service subscriber. But applications are known that can be used to insert an arbitrary phone number (e.g., a phone number not associated with the communication device actually generating the origination message) and an arbitrary subscriber identity into the ANI field of an origination message. This may be referred to as call origination spoofing or ANI spoofing in some contexts herein. In some cases, ANI spoofing may be employed to perpetrate identity theft or more generally to commit cybercrimes. The present disclosure teaches a call verification framework for providing additional information to enterprise call centers that they can use to reduce their vulnerability to call origination spoofing or ANI spoofing.

One approach to call verification entails a communication service provider determining additional information about a call and/or subscriber and storing this additional information in metadata fields of the call origination message. This information can be used by the called party—the enterprise call center—to evaluate the caller as a legitimate call, a nuisance call, or a cyberattack. The communication service provider may analyze a call origination message as it transits its network infrastructure, determine that a called number in the call origination message is white listed to receive premium call verification class of service, determine the additional information, and store this information in the metadata fields of the call origination message. The enterprise call center may examine the additional information and choose to accept the call or to drop the call based at least in part on this additional information. The additional information may comprise an indicator that the call originator identified in the ANI is authenticated or is not authenticated. The communication service provider may have access to information identifying the call originator that is separate from the ANI in the call origination message, for example access to a mobile equipment identity (MEID) and a mobile phone number of a user equipment (UE) or mobile phone that originates the call origination message. If that mobile phone number matches the phone number stored in the ANI, the additional information stored in the metadata of the call origination message may indicate that the ANI is authenticated. If the phone number is different from the phone number stored in the ANI or if the service provider cannot determine the call originator independently of the ANI, the additional information stored in the metadata fields of the call origination message may indicate that the ANI is not authenticated.

The communication service provider may provide further information in the metadata fields of the call origination message. For example, the service provider may indicate a variety of statuses of the UE that has originated the call and/or of the subscription account associated with the UE. The service provider may indicate a tenure of the subscription account, a UE stolen or lost status, a status of UE being swapped or a phone number being swapped recently on the account, a status of the voicemail for the subscription account being forwarded. These statuses may improve the ability of an enterprise call center to evaluate an incoming call origination message. In an embodiment, the information that the service provider stores in the metadata fields of the call origination message is encrypted using a secret key known to the enterprise call center. At the enterprise call center, the encrypted information stored in the metadata fields of the call origination message is decrypted using the secret key, and then the information is used in deciding how to treat the call origination message.

Another approach to call verification entails the enterprise call center sending one or more call verification request messages to an application programming interface (API) provided by the communication service provider at one or more times during handling of a call origination message. In some embodiments, an enterprise call center may employ both approaches to call verification.

The communication service provider may create call events at different points during a call that is identified as provisioned to receive a premium call verification class of service (e.g., the called number in the call origination message is associated with a phone number that is white listed to receive the premium call verification class of service). For example, a service control point (SCP) in the communication network may create a call origination event when the call origination message transits the network, establish a tracking context for the call that flags a UE and/or phone number associated with the UE as being in a call with the called number, create a call in-progress event about 30 seconds to 90 seconds after the call origination event is created, and create a call termination event when the call is taken down. The SCP may store these events in an archive or data store for later analysis. When the call is taken down, the SCP may destroy the tracking context for the call that was used to flag the UE and to link the UE and/or phone number associated with the UE with the called number.

The enterprise call center may send a call verification request message to the service provider, for example to the SCP associated with the subject call origination message or to a server computer system that executes a call verification application. The call verification request message identifies the called number (e.g., the phone number of the enterprise call center) and the number stored in the ANI. The SCP or server computer system looks up information associated with the call and returns this in a call verification response message. In an embodiment, the enterprise call center may send different requests, for example a call origination verification request message and a call in-progress verification request message. Alternatively, the enterprise call center may send a request in the same form at different phases during the call, and the SCP responds by returning all available information pertaining to the subject call.

The SCP may determine whether the UE associated with the ANI is currently off-hook and further whether the subject UE is connected to the called number provided in the request (e.g., the phone number of the enterprise call center). The term "off-hook" in this context means an operating state of the UE where a communications link from the UE to the eNB is enabled either for voice or data communications or network signaling. The result of this determination may be returned in the call verification response message also. The SCP may engage other network elements, for example a mobile switching center (MSC) or other communication node to determine the off-hook status of the UE. This explicit check of the off-hook status and called number associated with the off-hook status can detect some spoofing attempts and promote the enterprise call center avoiding handling such spoofing attempts.

The SCP may determine a call duration as the difference between a current time and a time of a call origination event. Alternatively, the SCP may determine a call duration as the difference between a time of an in-progress call event and a time of a call origination event. The SCP may return the call duration information along with additional call verification information, for example ANI authentication status (e.g., a match or failure to match between the ANI provided in a call origination message and a phone number determined by the communication service provider to be associated with the actual source of the call origination message), account tenure, UE stolen status, UE swap or phone number swap status, voicemail forwarding status, and other status. In an embodiment, the call duration information may be used by the call center to distinguish and avoid cyberattacks.

The various elements of call verification described above may be used by an enterprise call center to establish confidence that an incoming call is legitimate and not an attempt to spoof a call from a different subscriber or UE or an attempt to commit a cyberattack or cybercrime. The enterprise call center can elect to drop the call origination message entirely at the front end of the call, thereby avoiding unnecessary expense on its part to handle the call or to avoid a cyberattack. Alternatively, the enterprise call center may route a call to an interactive voice response (IVR) system, and when the call is about to be advanced to a human agent for further handling (and hence to consume more expensive business resources relative to processing by an automated system), the IVR may request further call verification from the SCP, for example by sending a call verification request message to the SCP. If the call verification response message comprises information that is negative, the IVR may drop the call without routing it on to a human agent or may pass the call on to a different IVR processing path that does not lead to handling by a human agent, for example to leave a voice message. Again, this can avoid unnecessary expense by reducing the burden of handling unnecessary or nuisance calls from the agents, which may result in the ability to staff the call center with fewer agents or to allow the agents to provide higher quality care for other legitimate callers. This may be referred to as an improved communication system or an improved interactive voice response system.

Figure 1:
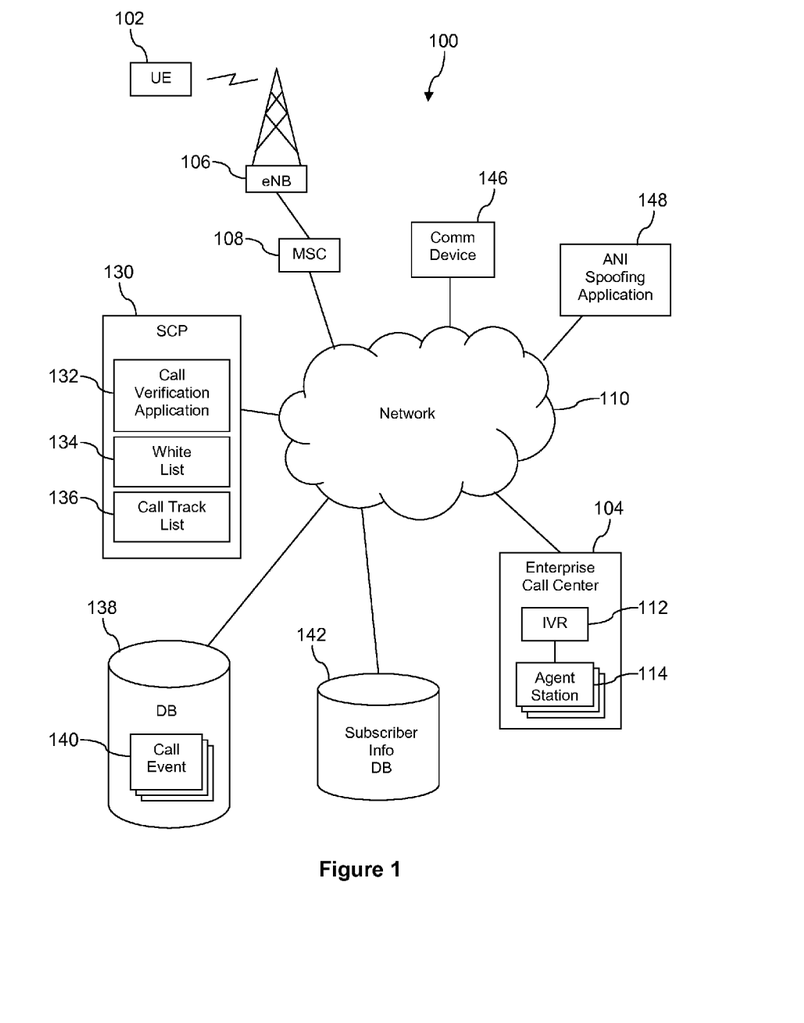
FIG. 1 is a block diagram of a communication system according to an embodiment of the disclosure.

Turning now to FIG. 1, a communication system 100 is described. In an embodiment, the system 100 comprises a user equipment (UE) 102 that attempts to call an enterprise call center 104. The system 100 may further comprise an enhanced node B (eNB) 106 or base transceiver station (BTS), a mobile switching center (MSC) 108, and a network 110. The enterprise call center 104 may comprise an interactive voice response (IVR) system 112 and one or more call agent stations 114. The system 100 may comprise a service control point (SCP) 130 that comprises a call verification application 132, a white list 134, and a call track list 136. The system 100 may comprise a data store 138 that stores a plurality of call events 140.

The UE 102 may be a mobile phone, a personal digital assistant (PDA), a media player, a headset computer, or a wearable computer. The network 110 is a communication network that comprises one or more private networks, one or more public networks, or a combination thereof. The eNB 106 may provide a wireless communication link to the UE 102 according to one or more of a long term evolution (LTE), a code division multiple access (CDMA), a global system for mobile communications (GSM), or a worldwide interoperability for microwave access (WiMAX) wireless communication protocol. The eNB 106 may provide communications coupling of the UE 102 to the network 110 via the MSC 108. In some contexts, the eNB 106 may be said to be part of a radio access network (RAN). In some abstractions, the RAN may further be considered to comprise the MSC 108. Alternatively, the MSC 108 may be considered be the bridging device between the RAN and the network 110 and to be part of the network 110. While shown separately, the SCP 130 may also be abstracted as part of the network 110 but is shown separately in FIG. 1 to promote describing delivery of the premium call verification class of service.

While a single UE 102, a single eNB 106, and a single MSC 108 are illustrated in FIG. 1, it is understood that the system 100 may comprise any number of UEs 102, any number of eNBs 106, and any number of MSCs 108. For example, the system 100 may comprise tens of millions of UEs 102, tens of thousands of eNBs 106, and hundreds of MSCs 108. Likewise, while a single SCP 130 and a single enterprise call center 104 are illustrated in FIG. 1, the system 100 may comprise any number of SCPs 130 and any number of enterprise call centers 104. In an embodiment, the enterprise call center 104 may be associated with a toll-free number.

The SCP 130 may provide support for calls placed to the enterprise call center 104, for example support for toll-free calls to the enterprise call center 104. The UE 102 may place a call to a 1-8xx number associated with the call center 104. The call may route through the eNB 106, through the MSC 108, through the network 110, to the SCP 130. A call origination message may be created, for example by the MSC 108 or by another network node in the network 110, and this call origination message may be sent to the SCP 130. The call origination message may comprise an automatic number identification (ANI) field, a called number (the number of the enterprise call center 104), and some unused metadata fields. The SCP 130 compares the called number in the call origination message to the white list 134. The white list 134 identifies phone numbers that are provisioned to receive premium call verification class of service from the SCP 130.

When a call origination message comprises a called number on the white list 134, the call verification application 132 may execute to provide the premium call verification service. It is understood that a variety of different premium call verification services are contemplated by the present disclosure. In an embodiment, the SCP 130 may be configured to provide only one variation of the premium call verification service. Alternatively, the SCP 130 may provide different variations of the premium call verification class of service depending on what variation the enterprise call center 104 is provisioned to receive.

In an embodiment, the call verification application 132 creates a call origination event associated with a call origination message with a called number that is on the white list 134 and stores it in the data store 138. In an embodiment, in response to determining that the called number is on the white list, the call verification application 132 creates a call track associated with the call origination message with a called number that is on the white list 134 and stores it in the call track list 136. The call track may identify the called number and the actual phone number of the device that actually creates the call origination message (e.g., not necessarily the same phone number contained in the ANI of the call origination message). The call verification application 132 may perform functions during the progress of a call associated with the call track, for example creating an in-progress call event a predefined time duration after the call origination event is created, for example between 30 seconds and 90 seconds after the call origination event is created. The call verification application 132 may further create a call termination event when the call associated with the call track is terminated or torn down. The call origination event, the in-progress call event, and the termination call event may be stored as call events 140 in the data store 138. The call events 140 may be retained in the data store 138 a predefined period of time and then deleted or transferred to a long term storage repository (not shown).

In an embodiment, when the calling number in the call origination message is on the white list 134, the call verification application 132 determines a call verification status and stores that verification status in one or more unused metadata fields in the call origination message, and then transmits the call origination message on to the enterprise call center 104 via the network 110. In an embodiment, the call verification status information is encrypted using an encryption key known to the enterprise call center 104. The call verification application 132 may employ a different encryption key for each different enterprise call center 104. After encryption, the encrypted verification status information is then stored in the unused metadata fields in the call origination message, and the SCP 130 then transmits the call origination message to the enterprise call center 104 via the network 110. The enterprise call center 104 may comprise a server computer (not shown) or other computer that mediates between in-coming phone calls and the IVR 112. An application executing on a server computer in the call center 104 may perform the decryption and analysis of the verification status information stored in the call origination message.

Figure 2:
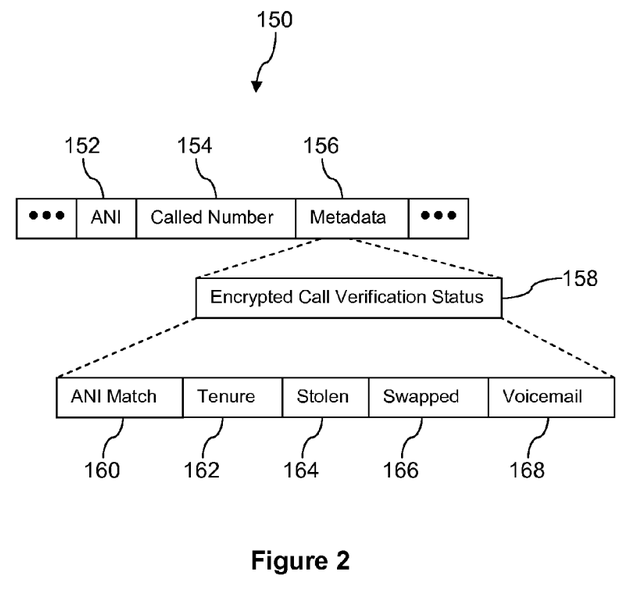
FIG. 2 is a diagram of a call origination message structure according to an embodiment of the disclosure.

Turning now to FIG. 2, a call origination message 150 is described. It will be appreciated that the call origination message 150 may have fields that are not described herein. In an embodiment, the call origination message 150 may comprise an automatic number identification (ANI) 152, a called number 154, and metadata 156. It is understood that the ANI 152, the called number 154, and the metadata 156 may be located within the call origination message 150 in some other sequence or order than that illustrated in FIG. 2. Likewise, while illustrated as contiguous with each other, there may be other fields intercalated between the ANI 152, the called number 154, and/or the metadata 156. The metadata 156 may be interspersed throughout the call origination message 150. Said in other words, the metadata 156 illustrated as a contiguous block in FIG. 2 may be composed of separate blocks of metadata that are not contiguous with each other. Some of the metadata 156 may be unreserved or undefined by known communication protocols, for example in the SS7 signaling protocol. In an embodiment, the call verification application 132, or another application executing in the network 110, generates encrypted call verification status information 158 and stores that information in the metadata 156.

The call verification status information that is encrypted may be any of a variety of different information, from very simple and basic verification information to multi-component verification information. For example, the call verification information may comprise a verified/unverified flag or Boolean value. In the instance that the call verification application 132 determines that the ANI 152 does not match a phone number of a device that created the call origination message 150, the call verification information may be set to "FALSE" or "0." If the ANI 152 does match a phone number of the device that created the call origination message 150, the call verification information may be set to "TRUE" or "1." Alternatively, the call verification status information may comprise multiple components. For example, the call verification status information may comprise an ANI match component 160, a subscription account tenure component 162, a stolen component 164, a swapped component 166, a voicemail forwarded component 168, or other fields.

The ANI match component 160 may indicate that the ANI 152 corresponds to the phone number of a communication device actually originating the phone call, actually creating the call origination message 150. For example, the UE 102 may dial the phone number of the enterprise call center 104, and the phone number associated with the UE 102 may be contained in the ANI 152. The call may route through the eNB 106, through the MSC 108, and into the network 110. In an embodiment, the SCP 130 or the call verification application 132 may determine the actual phone number associated with the creator of the call origination message 150 (e.g., the UE 102).

The actual phone number information may be available to the SCP 130 because it is within the trusted confines of the network infrastructure and may have access to the parameters of the call. For example, the SCP 130 may know the MEID of the device (e.g., the UE 102) that originated the call and access the subscriber information data store 142 to find out the phone number of the device identified by the MEID. Alternatively, the SCP 130 of the call verification application 132 may query the MSC 108 to identify the phone number of the UE 102 that has created the call origination message 150. In the event that the call was originated in a foreign network (for example, in a network operated by a different mobile communication service provider), the SCP 130 may query the foreign network to map the MEID to a phone number. This kind of query may be made to a foreign network with which the service provider has established wireless roaming agreements.

In another scenario, a communication device 146 may invoke an ANI spoofing application 148 to generate a call origination message that comprises a spoofed ANI, for example an ANI value that does not correspond to a phone number of the communication device 146. In this case, the call verification application 132 may determine that the ANI 152 does not correspond to the actual phone number of the communication device 146 or that such a correspondence cannot be confirmed. In either case, the ANI match component 160 indicates whether the ANI match to an actual calling number can be confirmed or not.

The subscription account tenure component 162 indicates how long the subscription account associated with the UE 102 has been active. The tenure is indicated in months or years or in some other unit of time. The call verification application 132 may determine the tenure by accessing subscriber data known by the communication service provider, for example by accessing a subscriber information data store 142. The stolen component 164 indicates whether the UE 102 has been reported as lost or stolen. The swapped component 166 indicates whether the UE 102 has been swapped for an earlier device recently or whether the phone number associated with the UE 102 has been swapped recently. The voicemail forwarded component 168 indicates whether the voicemail associated with the UE 102 is currently forwarded to a different phone number. The information associated with components 162, 164, 166, and 168 may be determined by the call verification application 132 by accessing subscriber data known by the communication service provider, for example by accessing a subscriber information data store 142. In an embodiment, if the ANI match is negative, the call verification application 132 may not provide values or may provide NULL values for the other components 162, 164, 166, 168.

After building the call verification status information, encrypting the call verification status 158, and storing it into the metadata 156 of the call origination message 150, the SCP 130 sends the call origination message 150 to the enterprise call center 104 via the network 110. It is understood that the call origination message 150 may traverse a number of network nodes before reaching the enterprise call center 104. At the enterprise call center 104, the encrypted call verification status information 158 may be decrypted, for example by an application executing on a server computer in the enterprise call center 104. The information may be analyzed to determine whether to connect the call or drop the origination call message 150 without connecting the call. For example, if the ANI match indicates that the ANI cannot be verified (either because of insufficient information about the creator of the call origination message 150 or because the phone number of the creator does not match the ANI 152), the call origination message 150 may be dropped without further processing, possibly without reviewing the contents of the other components 162, 164, 166, 168.

If the ANI match component 160 verifies a match between the ANI 152 and an actual calling number of the UE 102, the enterprise call center 104 may connect the call with no further analysis. Alternatively, the enterprise call center 104 may examine the other components 162, 164, 166, 168 and make a decision to connect the call or to drop the call origination message 150 without connecting the call based on that examination. For example, if the stolen component 164 indicates that the UE 102 is lost or stolen, the enterprise call center 104 may drop the call origination message 104. The values stored in the components 162, 164, 166, 168 may provide indications of an elevated risk that the call is not from the subscriber associated with the UE 102.

The enterprise call center 104 may establish the call associated with the call origination message 150 and connect it to the IVR 112. The IVR 112 may provide a menu tree that the caller navigates to obtain one of a plurality of services supported by the enterprise call center 104. In some cases, the IVR 112 may be filtering the call to direct it to the appropriate call agent station 114, for example to a call agent who is skilled and/or knowledgeable in the subject that the caller is calling about. The enterprise call center 104, for example an application executing on a server computer in the enterprise call center 104, may send an in-progress call verification request message to an API provided by the call verification application 132. The in-progress call verification request message may be sent even if the call has previously been verified, for example prior to first connecting the call to the IVR 112. This may be done to further verify the call and to obtain a higher degree of confidence in the legitimacy of the call before engaging a human call agent.

The call verification application 132 may confirm that the calling number identified in the in-progress call verification request message is actually connected to the called number identified in the in-progress call verification request message, for example by sending a query to the MSC 108 or to another network node in the network 110. The call verification application 132 may access the call track list 136 using the called number identified in the in-progress call verification request message to determine if the SCP 130 is tracking a call from the calling number to the called number. If there is no such call in progress, the in-progress call verification response message indicates the call is not active. If there is an active call from the calling number to the called number, the call verification application 132 may determine an in-progress call duration time by comparing a call origination event and an in-progress call event stored in the call events 140 in data store 138. The duration may be determined based on a date and time of the call origination event and the time of the in-progress call event. Alternatively, the time duration may be determined based on the date and time of the call origination event and a current time known to the call verification application 132.

After a call to the enterprise call center 104 has completed, the enterprise call center 104, for example an application executing on a server computer in the enterprise call center 104, may send a call termination verification request message to the SCP 130 to determine information about the call. The SCP 130 and/or the call verification application 132 may generate a call termination verification response message and send this to the enterprise call center 104, wherein the response message may indicate a total duration of the call to the enterprise call center 104 and other parameters of the call. Additionally, the SCP 130 may send other information about the call in the response message, and the enterprise call center 104 may store this call information in a data store or call handling repository.

Figure 3:
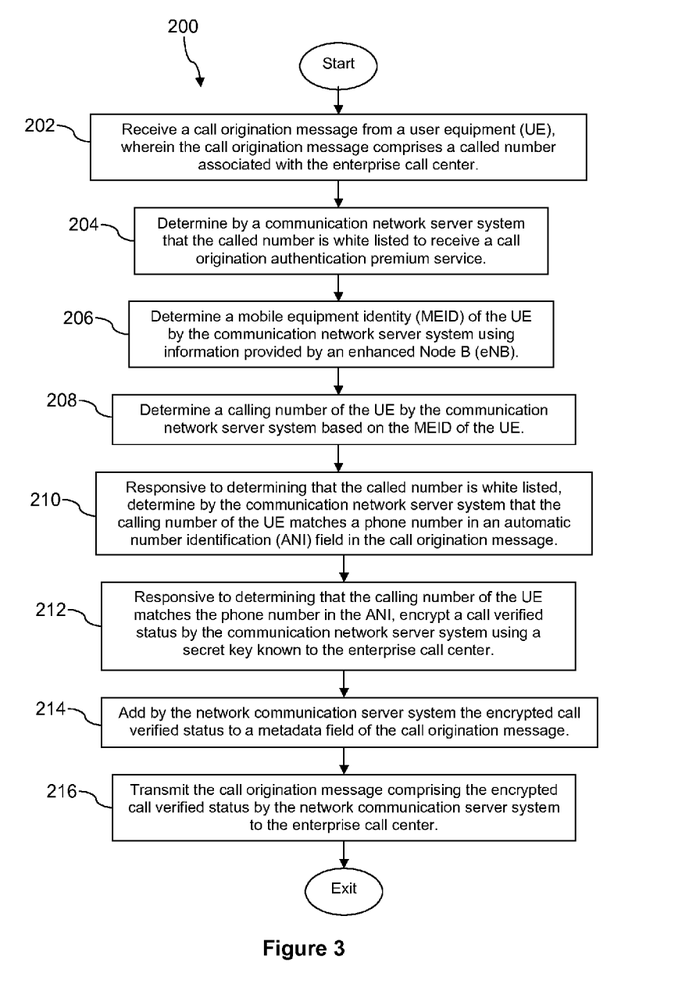
FIG. 3 is a flow chart of a method according to an embodiment of the disclosure.

Turning now to FIG. 3, a method 200 is described. At block 202, receive a call origination message from a user equipment (UE), wherein the call origination message comprises a called number associated with the enterprise call center. At block 204, determine by a communication network server system that the called number is white listed to receive a call origination authentication premium service. At block 206, determine a mobile equipment identity (MEID) of the UE by the communication network server system using information provided by an enhanced Node B (eNB). At block 208, determine a calling number of the UE by the communication network server system based on the MEID of the UE. At block 210, responsive to determining that the called number is white listed, determine by the communication network server system that the calling number of the UE matches a phone number in an automatic number identification (ANI) field in the call origination message. At block 212, responsive to determining that the calling number of the UE matches the phone number in the ANI, encrypt a call verified status by the communication network server system using a secret key known to the enterprise call center. At block 214, add by the network communication server system the encrypted call verified status to a metadata field of the call origination message. At block 216, transmit the call origination message comprising the encrypted call verified status by the network communication server system to the enterprise call center.

In an embodiment, the method 200 may be performed by one or more computer systems or server systems in a communication service provider network. For example, processing may be performed by the SCP 130 by itself or performed by the SCP 130 in concert with the MSC 108. The processing may be performed by the SCP 130 and by another server computer that executes an application that performs some of the functionality of the call verification application 132 described above and that maintains the call track list 136. The method 200 may provide a premium call verification class of service to the enterprise call center 104, thereby promoting the enterprise call center 104 reducing its vulnerability to call origination spoofing.

Figure 4:
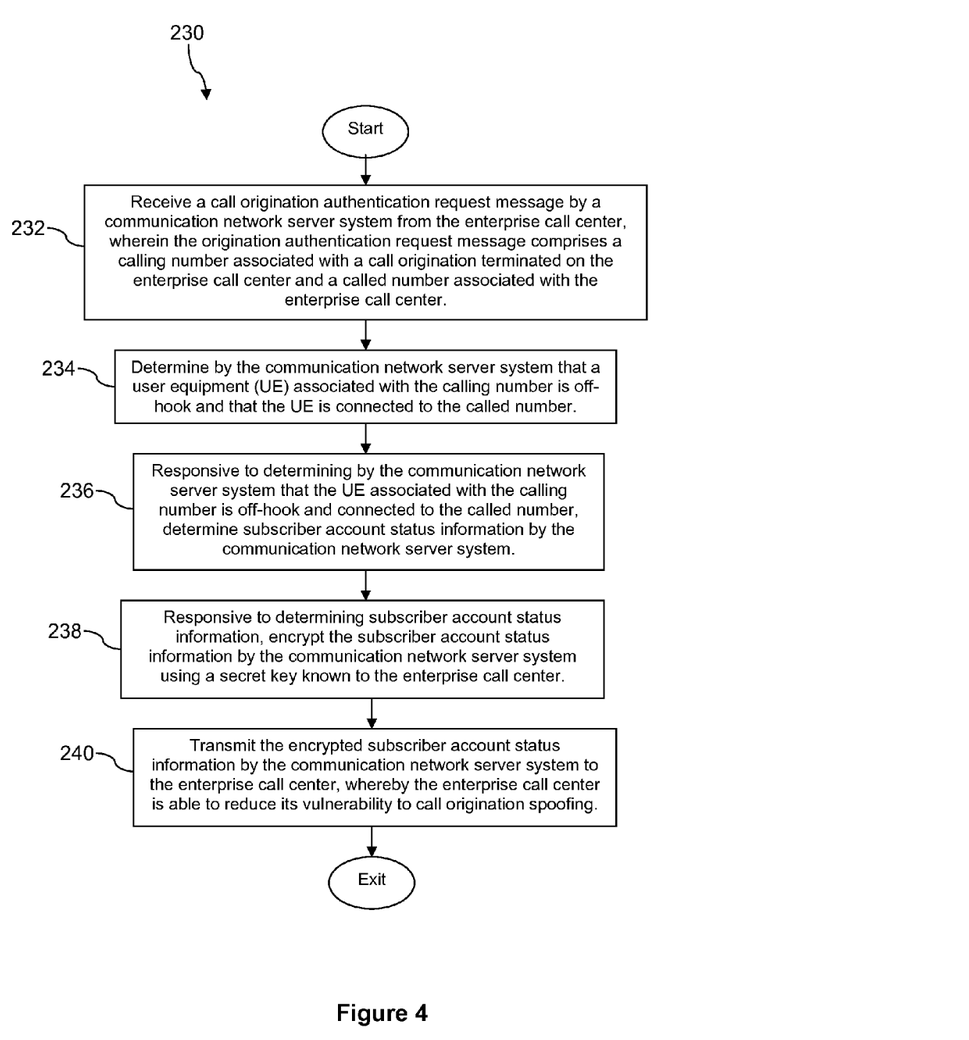
FIG. 4 is a flow chart of another method according to an embodiment of the disclosure.

Turning now to FIG. 4, a method 230 is described. At block 232, receive a call origination authentication request message by a communication network server system from the enterprise call center, wherein the origination authentication request message comprises a calling number associated with a call origination terminated on the enterprise call center and a called number associated with the enterprise call center. At block 234, determine by the communication network server system that a user equipment (UE) associated with the calling number is off-hook and that the UE is connected to the called number. At block 236, responsive to determining by the communication network server system that the UE associated with the calling number is off-hook and connected to the called number, determine subscriber account status information by the communication network server system.

At block 238, responsive to determining subscriber account status information, encrypt the subscriber account status information by the communication network server system using a secret key known to the enterprise call center. At block 240, transmit the encrypted subscriber account status information by the communication network server system to the enterprise call center, whereby the enterprise call center is able to reduce its vulnerability to call origination spoofing. The processing of method 230 may be performed by server computer systems in the service provider network, for example the SCP 130 and possibly a separate server computer that performs some of the functions of the call verification application 132 described above and that maintains the call track list 136.

Figure 5:
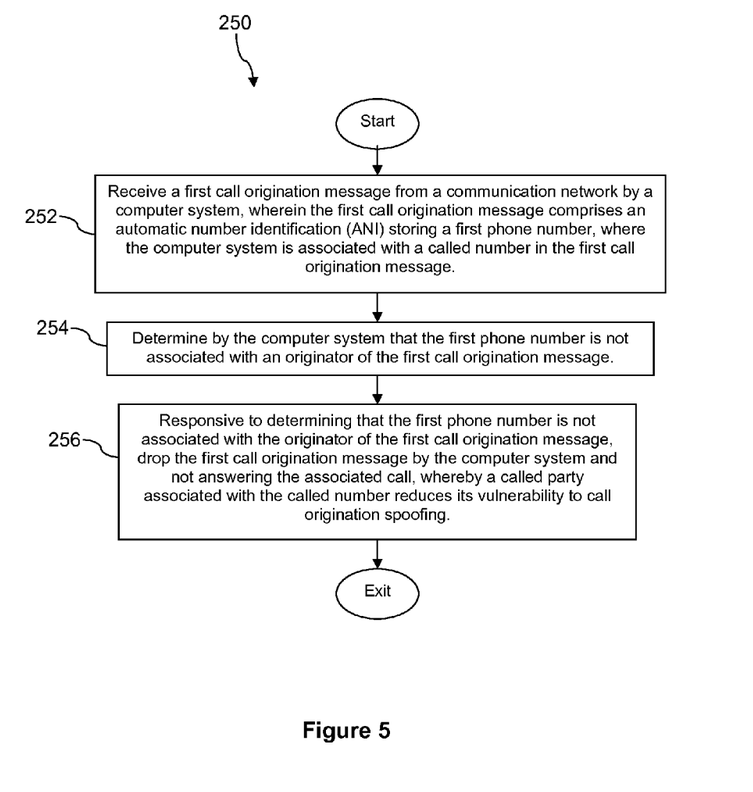
FIG. 5 is a flow chart of yet another method according to an embodiment of the disclosure.

Turning now to FIG. 5, a method 250 is described. At block 252, receive a first call origination message from a communication network by a computer system, wherein the first call origination message comprises an automatic number identification (ANI) storing a first phone number, where the computer system is associated with a called number in the first call origination message. At block 254, determine by the computer system that the first phone number is not associated with an originator of the first call origination message. At block 256, responsive to determining that the first phone number is not associated with the originator of the first call origination message, drop the first call origination message by the computer system and not answering the associated call, whereby a called party associated with the called number reduces its vulnerability to call origination spoofing. The processing of method 250 may be performed by an enterprise call center 104, for example by an application executing on a server computer intermediating between the network 110 and the IVR 112. Alternatively, the method 250 may be performed by a variety of other organizations such as political action committees, special interest groups, churches, government offices, and others.

Figure 6:
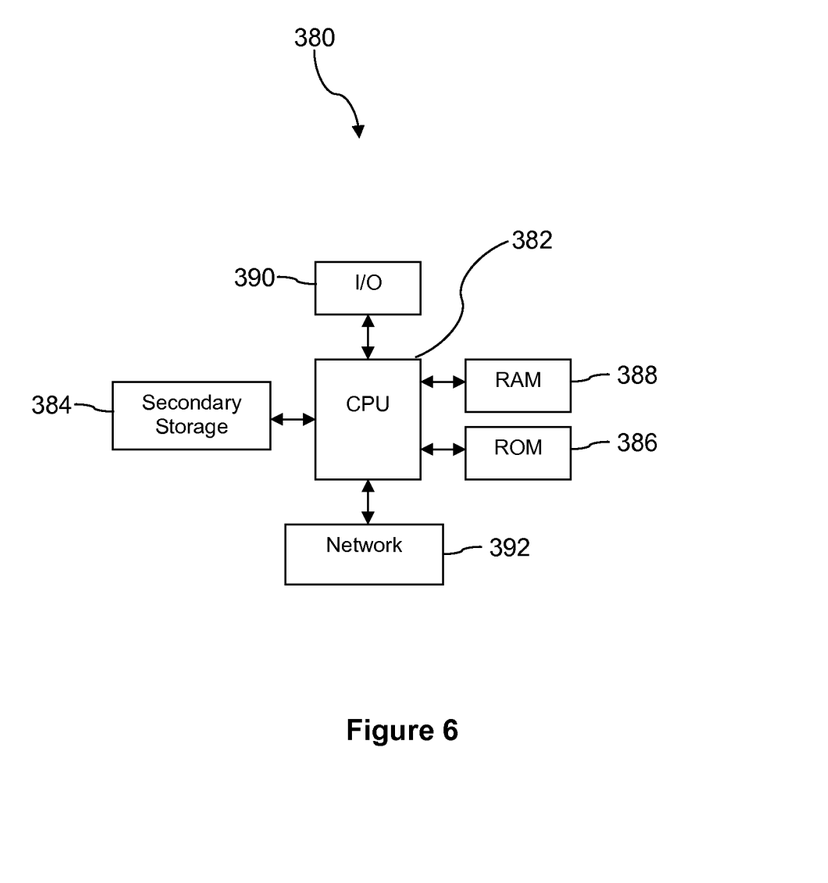
FIG. 6 is a block diagram of a computer system according to an embodiment of the disclosure.

FIG. 6 illustrates a computer system 380 suitable for implementing one or more embodiments disclosed herein. For example, the computer system 380 may be used to implement the SCP 130, the IVR 112 and other portions of the enterprise call center 104, the call agent stations 114, and other servers. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authenticating call origination, the method comprising:
   receiving, by a computer system, a call origination message from a communication network, wherein the call origination message comprises an automatic number identification (ANI) storing a phone number, and wherein the computer system is associated with a called number in the call origination message;
   determining, by the computer system, that the phone number is not associated with an originator of the call origination message;
   responsive to determining that the phone number is not associated with the originator of the call origination message, dropping, by the computer system, the call origination message and not answering an associated call, whereby a called party associated with the called number reduces its vulnerability to call origination spoofing;
   receiving, by the computer system, a second call origination message from the communication network, wherein the second call origination message comprises an ANI storing a second phone number and the called number associated with the computer system;
   responsive to receiving the second call origination message, transmitting, by the computer system, a call origination authentication request message to the communication network, wherein the call origination authentication request message comprises the second phone number and the called number;
   determining, by a communication network server system, that a second UE associated with the second phone number is off-hook and that the second UE is connected to the called number;
   responsive to determining that the second UE associated with the second phone number is off-hook and connected to the called number, determining, by the communication network server system, a call verification status;
   encrypting, by the communication network server system, the call verification status using a secret key known to an enterprise call center;
   transmitting, by the communication network server system, a call origination authentication response message comprising the encrypted call verification status to the enterprise call center;
   receiving, by the computer system, the call origination authentication response message from the communication network comprising the encrypted call verification status;
   decrypting, by the computer system, the encrypted call verification status, wherein the decrypted call verification status comprises one or more of a tenure of a subscriber account associated with the second phone number, a stolen status of the second UE associated with the second phone number, a status of a recent swapping of the second UE or swapping of the association of the second phone number and the second UE, and a status of voicemail forwarding active;
   based on the decrypted call verification status, determining, by the computer system, that the second phone number is associated with the second UE; and
   based on the decrypted call verification status, connecting a call associated with the second call origination message to the enterprise call center associated with the called number.

2. The method of claim 1, wherein the called number is a toll-free phone number.

3. The method of claim 1, further comprising:
   responsive to receiving the call origination message, transmitting, by the computer system, a second call origination authentication request message to the communication network, wherein the second call origination authentication request message comprises the phone number and the called number; and
   receiving a second call origination authentication response message from the communication network comprising a second call verification status, wherein the computer system determines that the phone number is not associated with the originator of the call origination message based on the second call verification status embedded in the second call origination authentication response message.

4. The method of claim 3, wherein the second call origination authentication request message is sent to and the second call origination authentication response message is received from a service control point server in the communication network.

5. The method of claim 3, wherein the second call verification status is encrypted, and wherein the computer system decrypts the encrypted second call verification status.

6. The method of claim 1, further comprising:
   determining, by the communication network server system, a second call verification status;

encrypting, by the communication network server system, the second call verification status by using a secret key known to the enterprise call center;

adding, by the communication network server system, the encrypted second call verification status to a metadata field of the call origination message; and transmitting, by the communication network server system, the call origination message comprising the encrypted second call verification status to the enterprise call center, wherein the computer system decrypts the encrypted second call verification status and determines that the phone number is not associated with the originator of the call origination message based on the decrypted second call verification status in the call origination message.

7. The method of claim 6, wherein determining the second call verification status comprises:

determining, by the communication network server system, a mobile equipment identity (MEID) of a user equipment (UE) that initiated the call origination message using information provided by an enhanced Node B;

determining, by the communication network server system, a calling number of the UE based on the MEID of the UE; and determining, by the communication network server system, whether the calling number of the UE matches the phone number in the ANI in the call origination message.

8. The method of claim 7, wherein the communication network server system comprises a service control point server and a mobile switching center (MSC), and wherein the MSC determines the MEID and the calling number of the UE.

9. The method of claim 6, further comprising:

determining, by the communication network server system, that the called number is white listed to receive a call origination authentication premium service, wherein the communication network server system determines the second call verification status in response to determining that the called number is white listed to receive the call origination authentication premium service.

10. The method of claim 9, wherein the communication network server system comprises a service control point server (SCP) and a mobile switching center, and wherein the SCP server determines that the called number is white listed.

11. The method of claim 1, further comprising:

receiving, by the computer system, a third call origination message from the communication network, wherein the third call origination message comprises an automatic number identification (ANI) storing a third phone number, the called number, and a metadata field storing an encrypted second call verification status, and wherein the encrypted second call verification status comprises one or more of a tenure of a subscriber account associated with the third phone number, a stolen status of a third user equipment (UE) associated with the third phone number, a status of a recent swapping of the third UE or swapping of the association of the third phone number and the third UE, and a status of voicemail forwarding active;

decrypting the encrypted second call verification status;

based on the decrypted second call verification status, determining that the third phone number is associated with the third UE; and based on the decrypted second call verification status, dropping the third call origination message.

12. The method of claim 1, further comprising:

receiving, by the computer system, a third call origination message from the communication network, wherein the third call origination message comprises an automatic number identification (ANI) storing a third phone number and the called number associated with the computer system;

responsive to receiving the third call origination message, transmitting, by the computer system, a second call origination authentication request message to the communication network, wherein the second call origination authentication request message comprises the third phone number and the called number;

receiving, by the computer system, a second call origination authentication response message from the communication network comprising a second call verification status, wherein the second call verification status comprises one or more of a tenure of a subscriber account associated with the third phone number, a stolen status of a third UE associated with the third phone number, a status of a recent swapping of the third UE or swapping of the association of the third phone number and the third UE, and a status of voicemail forwarding active;

based on the second call verification status, determining, by the computer system, that the third phone number is associated with the third UE; and based on the second call verification status, dropping the third call origination message.

13. The method of claim 12, wherein the second call verification status is encrypted, and further comprising decrypting, by the computer system, the encrypted second call verification status.

14. A method of authenticating call origination, the method comprising:

receiving, by a computer system, a call origination message from a communication network, wherein the call origination message comprises an automatic number identification (ANI) storing a phone number, and wherein the computer system is associated with a called number in the call origination message;

determining, by the computer system, that the phone number is not associated with an originator of the call origination message;

responsive to determining that the phone number is not associated with the originator of the call origination message, dropping, by the computer system, the call origination message and not answering an associated call, whereby a called party associated with the called number reduces its vulnerability to call origination spoofing;

receiving a second call origination message from the communication network by the computer system, wherein the second call origination message comprises an ANI storing a second phone number, the called number, and a metadata field storing an encrypted call verification status, and wherein the encrypted call verification status comprises one or more of a tenure of a subscriber account associated with the first phone number, a stolen status of a second user equipment (UE) associated with the second phone number, a status of a recent swapping of the second UE or swapping of the association of the second phone number and the second UE, and a status of voicemail forwarding active;

creating, by a communication network server system, an origination call event in a data store, wherein the origination call event identifies the called number, identifies the second phone number of the second UE, and identifies a date and time of the creation of the origination call event;

decrypting the encrypted call verification status;

based on the decrypted call verification status, determining that the second phone number is associated with the second UE;

based on the decrypted call verification status, connecting a call associated with the second call origination message to an enterprise call center associated with the called number; and creating, by the communication network server system, an in-progress call event in the data store, wherein the in-progress call event identifies the called number, identifies the second phone number of the second UE, and indicates a time duration of the call from the second UE to the enterprise call center based on a current time and date and based on the date and time of the creation of the origination call event associated with the call from the second UE to the enterprise call center.

15. The method of claim 14, further comprising:

receiving, by the communication network server system, an in-progress call authentication request message from the enterprise call center, wherein the in-progress call authentication request message comprises the second phone number and the called number associated with the enterprise call center;

responsive to receiving the in-progress call authentication request message, determining, by the communication network server system, a call time duration based on the in-progress call event; and transmitting, by the communication network server system to the enterprise call center, an in-progress call authentication response message comprising the call time duration.

16. The method of claim 14, further comprising:

responsive to receiving the call origination message, transmitting, by the computer system, a second call origination authentication request message to the communication network, wherein the second call origination authentication request message comprises the phone number and the called number; and receiving a second call origination authentication response message from the communication network comprising a second call verification status, wherein the computer system determines that the phone number is not associated with the originator of the call origination message based on the second call verification status embedded in the second call origination authentication response message.

17. The method of claim 14, further comprising:

determining, by the communication network server system, a second call verification status;

encrypting, by the communication network server system, the second call verification status by using a secret key known to the enterprise call center;

adding, by the communication network server system, the encrypted second encrypted call verification status to a metadata field of the call origination message; and transmitting, by the communication network server system, the call origination message comprising the encrypted second call verification status to the enterprise call center, wherein the computer system decrypts the encrypted second call verification status and determines that the phone number is not associated with the originator of the call origination message based on the decrypted second call verification status in the call origination message.

18. The method of claim 17, wherein determining the second call verification status comprises:

determining, by the communication network server system, a mobile equipment identity (MEID) of a user equipment (UE) that initiated the call origination message using information provided by an enhanced Node B;

determining, by the communication network server system, a calling number of the UE based on the MEID of the UE; and determining, by the communication network server system, whether the calling number of the UE matches the phone number in the ANI in the call origination message.

19. The method of claim 18, wherein the communication network server system comprises a service control point server and a mobile switching center (MSC), and wherein the MSC determines the MEID and the calling number of the UE.

20. The method of claim 17, further comprising:

determining, by the communication network server system, that the called number is white listed to receive a call origination authentication premium service, wherein the communication network server system determines the second call verification status in response to determining that the called number is white listed to receive the call origination authentication premium service.

* * * * *